Patented Oct. 17, 1944

2,360,540

UNITED STATES PATENT OFFICE 2,360,540

VINYL RESIN-CONTAINING COMPOSITIONS

Franklin A. Bent and George A. Stenmark, Berkeley, Calif., assignors to Shell Development Company, San Francisco, Calif., a corporation of Delaware No Drawing. Application March 17, 1942,
Serial No. 435,110

5 Claims. (Cl. 260—32)

This invention relates to novel compositions of resinous material. More particularly the invention is concerned with new and improved coating compositions comprising one or more vinyl resins suspended or dissolved in a solvent comprising or consisting of 1,2,3-trichlorobutane.

By vinyl resins is meant any relatively high molecular weight resinous polymer of a vinyl compound. An example of an aliphatic vinyl compound is vinyl acetate which polymerizes to a resin known variously as "gelva," "vinylite A," etc. The vinyl radical may be attached to a halogen atom as in vinyl bromide, or in vinyl chloride which polymerizes to give "koroseal." The aliphatic or aromatic vinyl compound may also have halogen or other inorganic constituents as in vinyl chloracetate. Various vinyl compounds may copolymerize, as vinyl chloride and vinyl acetate, to produce "vinylite V," or polyvinyl alcohol and vinyl acetate to yield "solvar." Similarly various vinyl ethers or polyvinyl alcohol may polymerize with aldehydes or ketones and the like. Polyvinyl alcohol itself is also a resin of some utility.

One preferred class of vinyl resins with which this invention is concerned is the vinyl aldehyde or "acetal" type, wherein polyvinyl alcohol is condensed with an appropriate aldehyde. The polyvinyl alcohol utilized in the production of these "acetal" or aldehyde type resins is obtained by the hydrolysis of polyvinyl acetate. The hydrolysis is not carried to completion so that the polyvinyl compound before the aldehyde condensation contains both acetate and hydroxyl radicals as in "solvar" above. The aldehyde then reacts with some of the hydroxyl radicals of the polyvinyl chain leaving the unhydrolyzed acetate as well as some unreacted hydroxyl radicals in the final product. This degree of hydrolysis and condensation is controlled for the purpose of varying the properties of the resulting resin. The viscosity of the resin varies with the size of the polyvinyl molecule, the aldehyde used, and the amount of polyvinyl acetate and alcohol retained. For example, polyvinyl butyral safety glass interlayer has a small percentage of vinyl acetate and a moderate percentage of vinyl alcohol.

Among the substances which have been used to supply the reactive group in this "acetal" type resin have been formaldehyde, acetaldehyde, acrolein, benzaldehyde, aldol, butyraldehyde, glyoxal, trioxymethylene, metaldehyde, methylal and the like. When formaldehdye is used a "formal" resin results (trade name: Formvar), acetaldehyde produces an "acetal" resin (trade name: Alvar), butyraldehyde yields a "butyral" resin (trade names, Butacite, Butvar, Vinylite X), etc. These various aldehyde resins for example may be employed in the preparation of lacquers, coating compositions, adhesives, artificial thread, impregnating solutions, emulsifiers and tanning agents, for sizing, dressing, printing, molded articles, sound records, as safety glass interlayers, bonding for plywood airplanes, and for many other purposes.

A coating composition is generally a liquid or semi-liquid mixture consisting of a non-volatile ingredient dissolved or suspended in a suitable solvent or liquid containing a volatile ingredient, in order that when the mixture is applied to a surface the volatile portion will evaporate to produce a solid thin surface film of the non-volatile portion.

Vinyl resins are desirable constituents of such coating compositions, particularly lacquers, finishes and surface coatings, because they have excellent resistant properties to acids, alkalis, oils and water. The vinyl resins also aid in producing a glossy finish when used in coating compositions. Hitherto recourse has been had in applying such polyvinyl coatings to comparatively expensive and now increasingly scarce solvents such as methanol, cresylic acid, methyl isobutyl ketone, cyclohexanone, isophorone, mesityl oxide, methyl ethyl ketone, etc., a number of which will dissolve only a small amount of the resin at room temperature or, if heated to increase the amount of dissolved resin, will gel on cooling.

It is accordingly an object of the present invention to provide new and useful vinyl resin-containing compositions which may contain more dissolved resin per volume of solvent, may be less volatile and/or less viscous than other hitherto used vinyl resin compositions and which contain a solvent component which is cheaper, more readily available and/or less inflammable than other currently used solvent components, as well as possessing other favorable characteristics which will be evident from the following description.

It has now been found that 1,2,3-trichlorobutane has excellent solvent properties for the above-described vinyl-type resinous compounds. This solvent is cheaply and readily obtained as a by-product of butadiene production. Its physical properties also give it numerous advantages over other presently used solvent components. It will not as readily absorb oxygen and contains less sulfur and other impurities than does cresylic acid, while giving less viscous solutions of acetal resin of comparable boiling range to corresponding solutions of acetal resins in cresylic acid. It has a much higher boiling point and is hence more easily recovered than methanol while producing a solution comparable in viscosity to acetal resins in methanol. Its ready miscibility with common aromatic and/or aliphatic diluents or thinners, as well as its excellent solvent properties for other resinous material, plasticizers, etc., which may be used in conjunction with vinyl resins makes it of particular utility. Among the desirable characteristics of the resulting resinous coating toward which the use of the solvent contributes, it should be noted that a solution of lower viscosity will result in a smoother, more evenly spread, more penetrating coating and one which is more easily and rapidly applied as, for example, by spraying the resinous solution or by dipping the object to be coated in the solution bath.

As described above, the properties of the vinyl resins vary, even in the same type of compound in the polyvinyl aldehyde type, for instance, with the particular aldehyde employed and the degrees of hydrolysis and condensation permitted, which qualities are altered to suit the various purposes for which the resin is to be employed. Hence the viscosity of any particular type resin in a certain solvent cannot be predicted without knowing these factors or experimentally determining the viscosity of the particular compound or solution in question. However, in general, the relative solvation effectiveness of various solvents would be similar in their application to any particular resin of the type herein described.

The advantages of 1,2,3-trichlorobutane as a resin solvent are further illustrated by its application in the production of a polyvinylformal-base insulating enamel which is applied to electric wires and the like. This resin has a high formal content and a high softening temperature. It requires a relatively high temperature for compression molding, is not suitable for injection molding and is accordingly applied to the wire or other object by contact with a coating solution as by dipping, spraying and the like, and then allowing the solvent to evaporate leaving the resinous coating. The solvent used in this process at the present time is cresylic acid, a material of no inconsiderable cost and now of increasing scarcity and competing uses. It has now been found according to the present invention that solutions of Formvar (polyvinyl formaldehyde resin) in 1,2,3-trichlorobutane are lighter in color and lower in viscosity than solutions of the same amount of Formvar in cresylic acid. This means that where previously there was used a cresylic acid solution of such viscosity that it could not be sprayed, a 1,2,3-trichlorobutane solution of the corresponding amount of polyvinyl formal resin can be applied by spraying. Or where previously a coating was applied by a viscous cresylic acid solution, as for instance by dipping, a thicker coating may be applied by a 1,2,3-trichlorobutane solution of the same viscosity, since it will have more of the desired resin dissolved therein. The following comparison indicates the great difference in viscosity and consequent advantage of 1,2,3-trichlorobutane over cresylic acid as a solvent for polyvinyl aldehyde type resins in particular. The following solutions were made up and their viscosities determined in the Hoppler Viscosimeter at 20° C.

| 5% Formvar | $d_4^{20}$ | Viscosity (centipoise) |
| --- | --- | --- |
| In 1,2,3-trichlorobutane | 1.29 | 229 |
| In cresylic acid | 1.03 | 9,420 |

Ten percent solutions of the same Formvar in both cresylic acid and 1,2,3-trichlorobutane were exceedingly viscous and cloudy but, as before, the 1,2,3-trichlorobutane solution was superior in viscosity and color. As explained above, these figures cannot be taken as holding for all samples of polyvinylformal resin, since the composition of these resins varies from one manufacturer to another and is adapted to the purpose for which it is to be applied. The essence of the present invention consists in the application of the discovery of 1,2,3-trichlorobutane as a solvent for vinyl resins and its superiority over such solvents as cresylic acid, methanol and the like, from the aspect of cost and availability as well as from the aspect of desirable physical properties such as viscosity, compatibility with diluents, purity, volatility, boiling range, and the like.

Coating compositions comprising vinyl resins and 1,2,3-trichlorobutane may be applied by roller coating, dipping, brushing, spraying and the like. They may be employed on metal, wood, paper, felt, stone, fabric, concrete, plastic compositions, Transite board, etc. Such coating compositions may also be employed as adhesives for laminated glass, or to wax, wood, paper, cardboard, asbestos board, etc., to adhere to glass, rubber, metal, wood and the like. They are especially well suited for lining food containers, beer cans and such.

The invention claimed is:

1. A coating composition comprising about 5% by weight of a polyvinylformal resin dissolved in 1,2,3-trichlorobutane.

2. A coating composition comprising a polyvinylformal resin dissolved in 1,2,3-trichlorobutane.

3. A coating composition comprising a polyvinyl acetal resin dissolved in 1,2,3-trichlorobutane.

4. A coating composition comprising a polyvinyl acetate resin dissolved in 1,2,3-trichlorobutane.

5. A coating composition comprising a polyvinyl resin dissolved in 1,2,3-trichlorobutane.

FRANKLIN A. BENT.
GEORGE A. STENMARK.